Dec. 8, 1936. H. S. WALKER 2,063,569
UNDERFLOOR DUCT BOX
Filed Nov. 25, 1933    2 Sheets-Sheet 1
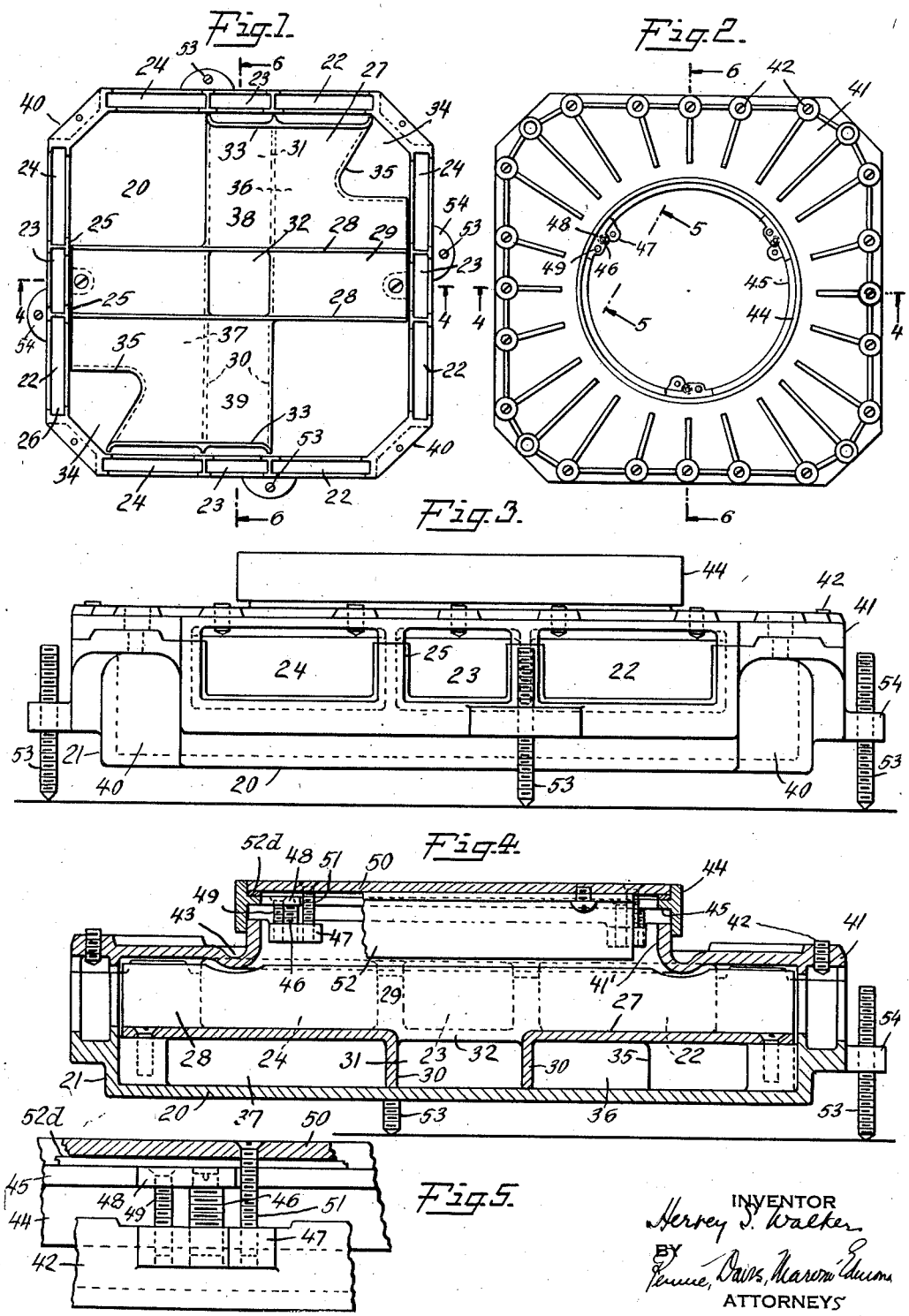

Dec. 8, 1936.    H. S. WALKER    2,063,569
UNDERFLOOR DUCT BOX
Filed Nov. 25, 1933    2 Sheets-Sheet 2
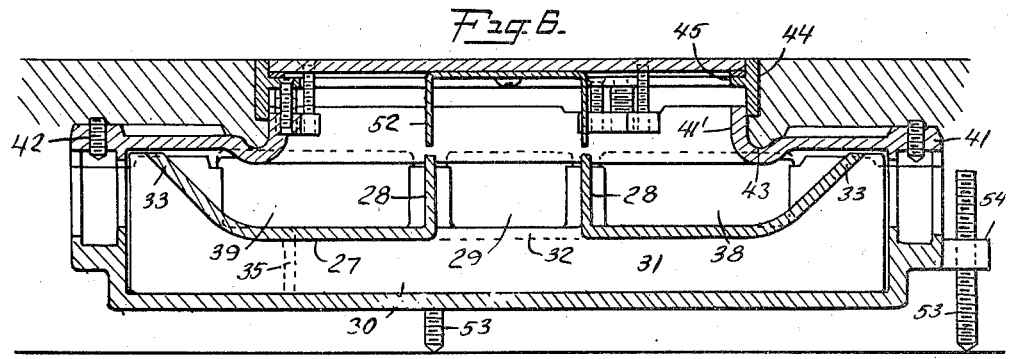
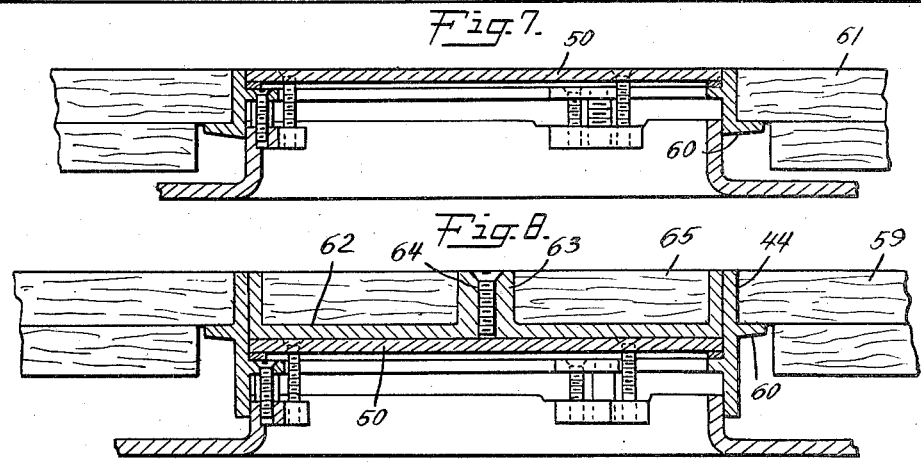
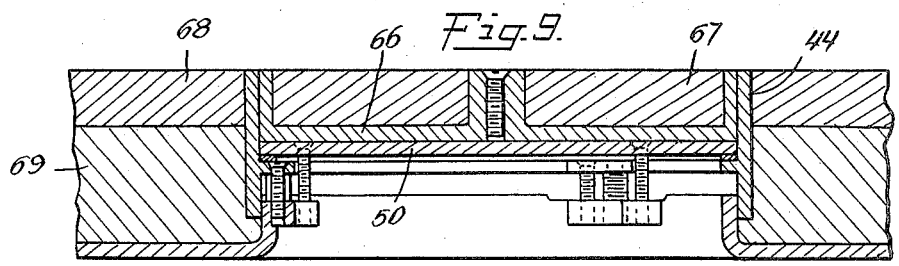
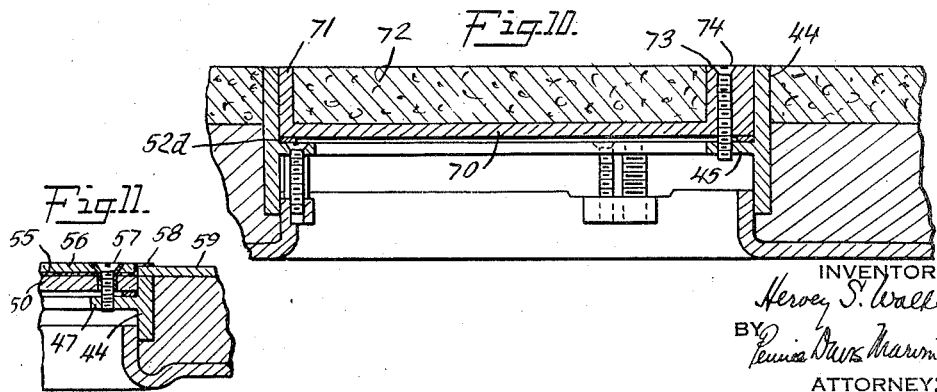
INVENTOR
Hervey S. Walker
BY
Pennie Davis Marvin Edmonds
ATTORNEYS Patented Dec. 8, 1936

2,063,569

UNITED STATES PATENT OFFICE 2,063,569

UNDERFLOOR DUCT BOX

Hervey S. Walker, Ardmore, Pa.

Application November 25, 1933, Serial No. 699,649

5 Claims. (Cl. 247—19)

This invention relates to electrical wiring systems of the concealed type, such as are installed in the floors of office and similar buildings and known as underfloor duct systems. More particularly, the invention is concerned with a novel junction box for use in such systems at the intersections of the runs of duct, the new box being of simple rugged construction and providing a satisfactory and inexpensive device for permitting the crossing of the ducts, affording access to the wiring of the system, and supplying current to the system wiring from a distribution center. The new box is primarily intended for use in a wiring system made up of runs of duct with three ducts in each run, and its interior structure is such as to provide separate passages across the interior of the box in two directions through which the wiring from aligned ducts on opposite sides of the box may be led. It includes other features of novelty, however, which are applicable to various other boxes of the same general type.

The new box comprises a body which is formed in part of a bottom having integral side walls provided with openings for the reception of the ends of ducts and spaces which may be tapped to receive the ends of conduits for supply wires. Within the body is a removable partition member which rests on the bottom and is held in place by suitable means. This partition member has spaced vertical flanges on its top and bottom surfaces which partially define wiring passages extending both over and under the member, the top and bottom passages being closed by the bottom of the box and a top member, respectively. The top member has an opening through which access is afforded to the interior of the box and the opening is closed by a cover in a mounting which provides adjustment of the height of the cover surface above the top member. The cover and its mounting may take different forms depending upon the type of floor construction in which the box is to be installed.

For a better understanding of the invention, reference may be made to the accompanying drawings, in which Fig. 1 is a plan view of the new box with the top removed;

Fig. 2 is a plan view with the top in place and the cover removed;

Fig. 3 is a side view of the box;

Figs. 4, 5 and 6 are sectional views on the lines 4—4, 5—5 and 6—6 respectively of Fig. 2; and Figs. 7, 8, 9, 10 and 11 are fragmentary sectional views through the top and different forms of the cover of the box.

As illustrated in the drawings, the new box, which is made of metal, comprises a bottom member 20 having integral side walls 21, which are formed so as to give the box a generally square outline but with the corners cut off. Each wall is provided with three openings 22, 23, and 24 for the reception of ducts and these openings extend up to the upper edge of the side wall with adjacent openings separated by vertical members 25. The three walls of each opening are channelled, as indicated at 26, for the reception of packing material by which the entrance of moisture into the box around the ends of the ducts is prevented.

Within the box is a partition member 27, which may be made as a single casting and this member is provided at its top with spaced vertical flanges 28 which extend across the box and partially define a passage 29 for wiring which leads across the top of the partition member from the middle opening in one wall of the box to the corresponding opening in the opposite wall. On its under side the partition member is provided with similar spaced flanges 30 extending across the box and partially defining a passage 31 which leads beneath the partition member from the middle duct opening at one side of the box to the corresponding opening in the opposite wall. The passages 29 and 31 are at right angles and they are in communication through an opening 32 through the partition member. The flanges 30 rest on the bottom of the box so that the flanges, the bottom of the box, and the generally horizontal portion of the partition member cooperate to enclose the passage 31. The major horizontal portion of the partition member lies substantially in alignment with the bottom of the openings in the side walls of the box, and in order that wiring introduced through a central opening may be led into the passage 31, the horizontal portion of the partition member is turned upwardly adjacent the openings to which the passage leads with the edge of this upwardly turned portion 33 lying substantially in the plane of the top of the side walls.

At opposite corners of the box, the partition member is cut away to leave spaces 34 and the horizontal portion of the member has downward flanges 35 along the edges of each space, which contact with the bottom of the box. A passage 36 is then provided across the box beneath the partition member at one side of the passage 31, and the passage 36 extends from a duct opening 22 in one wall to the duct opening 22 in the opposite wall. One side wall of this passage is formed by a flange 30, and the passage is closed at its bottom by the bottom of the box and at its other side by a side wall of the box and by the downward flange on the partition member. A similar passage 37 beneath the partition member and parallel with the passage 36 lies on the other side of the passage 31, passage 37 connecting duct openings 24 in opposite walls of the box and being closed at its bottom by the bottom of the box and at its sides by a flange 30, the side wall of the box, and the edge flange on the partition member. At one end of each of the passages 36 and 37, the horizontal portion of the partition member is turned up as at 33 so that access to these passages through the duct openings in the walls of the box may be had.

Extending across the box above the partition member at one side of passage 29 is a passage 38 connecting duct openings 24 in opposite walls of the box, and this passage is defined in part by a flange 28, the horizontal portion of the partition member, the side wall of the box and the upwardly turned part 33 of the partition member. On the other side of the passage 29, there is a passage 39 extending over the partition member and connecting duct openings 22 in opposite walls of the box. This passage is defined in the same way as the passage 38, and the passages 29, 38 and 39 are all closed at the top by the top member of the box.

To facilitate making connections in the wiring, it is desirable that the passage 37 connecting duct openings 24 and extending beneath the partition member should communicate with the passage 38 extending across the box above the partition member at right angles to passage 37 and also connecting duct openings 24 in opposite walls of the box. For this purpose, the partition member has no horizontal portion at the place where the passages cross and, therefore, in one corner of the box, the two passages are open to one another. Passage 36, extending beneath the partition member, likewise has a portion in common with passage 39, a part of the horizontal portion of the partition member having been omitted for the purpose.

The cut-away corners of the side walls of the box have blank walls 40 which may be tapped for the reception of conduits for feed wires and behind two of these walls lying diagonally across the box, the partition member is formed as previously mentioned to provide the spaces 34 for the introduction of the wiring. The downwardly extending edge flange 35 along the edge of each space 34 rests on the bottom of the box and thus serves to prevent contact of feed wiring for one tension with system wiring of another tension.

Resting on the top of the side walls of the bottom member is a top 41, held in place by screws in the usual way. This top member is formed to cooperate with the side walls of the box and the vertical members 25 so as to complete the openings 22, 23, and 24 in which the ends of the ducts are received, and the top carries grounding screws 42 which can be driven into engagement with the duct ends to hold them in place and ground the ducts to the box. In the middle of the top, there is a circular opening defined by an upstanding flange 41' and on the outside of the flange there is a circumferential channel 43. The opening is sufficiently large to overlie portions of the passages 29, 38, and 39 above the partition member, including parts of those passages where access is provided to the passages 31, 36, and 37 beneath the partition member.

The top opening is provided with a cover in an adjustable mounting, and the mounting comprises a collar 44 which has an inner circumferential flange 45. The collar is of slightly greater inner diameter than the flange 41' around the opening, and the flange 45 overlies the top of the flange 41'. Adjustment screws 46 are threaded into inwardly extending lugs 47 on the flange 41' and the collar flange 45 has inwardly extending lugs 48 which rest on the top of these screws. By adjustment of the screws, the collar can be levelled properly relative to the floor surface and can also be raised and lowered. The collar is held in adjusted position on the flange 41' by means of holding screws 49 which pass through the lugs 48 and into lugs 47. Mounted in the upper end of the collar 44 is a cover plate 50 which is held in place by screws 51 which pass through the plate and into lugs 47 on flange 41'. The cover plate is provided with fins 52 which overlap the flanges 28 on the partition member and serve with the plate to close off the top of passage 29. A packing washer 52d is interposed between the cover plate and the flange 45 to make the construction watertight.

When the box is to be used in a concrete floor with the cover exposed at the floor surface, the box is installed, for example, on the rough slab, during the construction of the floor. The box is supported on the slab by screws 53 extending downward from lugs 54 which project outward from the bottom member of the box and may be adjusted to level the box. After the box has been placed in proper position, the collar 44 is placed in proper adjusted position by means of the adjustment screws 46. Since the collar overlaps the flange 41' on the top of the box by a considerable amount, the collar can be adjusted up and down relative to the flange without forming an opening through which moisture can enter the box. This adjustment also permits the cover plate to be brought into exact level with the finished floor surface.

When the box is to be used in a concrete floor which is to be covered with linoleum, it may be desirable to place a layer of linoleum over the cover plate of the box to conceal the plate, and for this purpose, the construction shown in Fig. 11 may be used. The box is installed as before, during the construction of the floor, and the collar 44 is adjusted so that its upper surface lies in the level of the cement floor surface. A circular dish 55 is then provided for the reception of a disc 56 of linoleum, the dish 55 having a depth just sufficient to receive the linoleum. The dish is held in place on the cover plate 50 by screws 57 which pass through the linoleum, the dish, and the cover plate and enter lugs 47 on the flange 42. The dish has a rim 58 which overlies the linoleum 59 along the outer edge of the dish, and with this construction, only the rim 58 of the box is visible in the floor surface. By removal of the screws 57, the dish can be lifted out so as to expose the cover plate 50 and access to the interior of the box is then obtained by removal of that plate in the usual way.

In some instances, the box may be employed in a floor construction in which the floor surface is made of boards laid on sleepers. For such use, the box has the construction previously described, but a different type of collar, illustrated in Fig. 7, is used. This collar has an outwardly extending flange 60 which provides a ledge on which the floor boards 61 may rest so that the ends of the boards will be properly supported around the box.

Where the box is to be used in a floor having a wood surface at a place where the appearance of the metallic top would be objectionable, the construction illustrated in Fig. 8 may be used. In this case, the collar 44 that is employed is of increased height so that it projects upwardly beyond the cover plate 50 and it also has the outward circumferential flange 60 on which the ends of the floor boards 59 are supported adjacent the collar. Within the collar, there is now employed a dish 62 which has a central boss 63 containing a screw 64. This dish is sufficiently deep so that portions 65 of the flooring may be placed within it and the dish rests in place on the cover plate 50 of the box without connection thereto. The dish can be removed by backing out the screw 64 which then provides a convenient handle for lifting the dish, and upon removal of the dish, the cover plate 50 is exposed and can then be taken out in the usual manner. With this construction, the major part of the top of the box is covered by flooring and the only exposed portions are the edge of the collar, the rim of the dish, and the top of the boss 63 with its screw 64.

Where the box is to be used in a marble floor at a point where it would be undesirable to have the cover plate visible, a dish 66 is employed similar to the dish 62, and marble 67 is introduced into the dish so as to conceal the major portion of it. As the marble floor surfacing 68 is laid on concrete 69 and thus requires no support adjacent the box, the collar 44 is not provided with an outward circumferential flange as in the construction illustrated in Fig. 8.

When the box is to be employed in a floor having a terrazzo surfacing at a point where it is desirable to conceal the top of the box, the collar 44 employed is similar to that disclosed in Fig. 9 and projects upwardly a substantial distance above the flange 42 on the box top. A cover plate 70 is then used which has a circumferential rim 71 extending up above the plate a distance sufficient to receive a substantial quantity of the terrazzo material 72. The cover plate is then provided with lugs 73 extending inwardly from flange 71 and affording means by which the cover can be attached to the flange 45 by screws 74 in such a way as to compress the packing material 52d and making the top watertight.

The new box affords numerous advantages over junction boxes heretofore used in three duct systems in that it is simple and relatively inexpensive to make and of rugged construction so that it will withstand handling during shipment and installation. Aside from the cover construction, the box comprises only three main parts, namely, the bottom, the partition member, and the top, and these can all be made of cast metal at low cost.

The new top construction may be used on all boxes of the same general type and it provides a simple, inexpensive structure, which is readily adjustable and adapted for use as described in floor constructions of various sorts.

What I claim:

1. A box for use in underfloor duct systems which comprises a body having an open upper end and openings in the side walls for the reception of the ends of ducts, a top resting on said body to close the open upper end thereof and having an opening to the interior of the box, an upstanding flange surrounding said opening, and a cover for said opening including a collar enclosing said flange with a snug fit, means for supporting the collar in position relative to said flange, said means lying within the collar and flange when the cover is in position on said top, a cover member mounted on said collar enclosing the opening therethrough, and an outwardly extending flange on said collar lying in a plane transverse to the axis of said collar for supporting floor material adjacent said collar.

2. A box for use in underfloor duct systems which comprises a body having an open upper end and openings in the side walls for the reception of the ends of ducts, a top resting on said body to close the open upper end thereof and having an opening to the interior of the box, an upstanding flange surrounding said opening, and a cover for said opening including a collar enclosing said flange with a snug fit, and a flange extending inward from said collar in a plane transverse to the axis of said collar, adjustable means engaging said flanges for supporting the collar in different positions relative to said upstanding flange, an outwardly extending flange on the collar lying in a plane transverse to the axis of said collar for supporting flooring adjacent said collar, and a cover member mounted on said collar.

3. A box for use in underfloor duct systems which comprises a body having an open upper end and openings in the side walls for the reception of the ends of ducts, a top resting upon and secured to said body, said top having a flat portion and an opening to the interior of the box, said top having an upstanding flange surrounding said opening, a projection extending inwardly of said flange, a cover for the opening in said top including a collar enclosing said flange, means for supporting said cover in proper position relative to said flange, and means lying within said flange for connecting the cover to said projection.

4. A box for use in underfloor duct systems which comprises a body having an open upper end and openings in the side walls for the reception of the ends of ducts, a top resting upon and secured to said body, said top having a flat portion and an opening to the interior of the box, said top having an upstanding flange surrounding said opening, a projection extending inwardly of said flange, a cover for the opening in said top including a collar enclosing said flange, means for supporting said cover in proper position relative to said flange, means lying within said flange for connecting the cover to said projection, and a member lying at least partly within the upper part of said collar, said member being supported by the cover and adapted to contain floor surfacing material.

5. A box for use in underground duct systems which comprises a body having an open upper end and openings in the side walls for the reception of the ends of ducts, a top resting upon and secured to said body to close the open upper end thereof, said top having an opening to the interior of the box and an upstanding flange surrounding said opening, a cover for said opening including a collar enclosing said flange, said collar having a projection overlying said flange, means for supporting the cover in proper position relative to said flange, and means for connecting the projection on the collar to the top.

HERVEY S. WALKER.